United States Patent
Rink et al.

(10) Patent No.: US 8,878,408 B2
(45) Date of Patent: Nov. 4, 2014

(54) BEARING HAVING A POWER GENERATION UNIT

(75) Inventors: Thomas Rink, Waldfenster (DE); Stefan Kleiber, Bergrheinfeld (DE); Martin Kram, Gerolzhofen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 278 days.

(21) Appl. No.: 13/381,991

(22) PCT Filed: Jul. 1, 2010

(86) PCT No.: PCT/DE2010/000762
§ 371 (c)(1),
(2), (4) Date: Mar. 20, 2012

(87) PCT Pub. No.: WO2011/000362
PCT Pub. Date: Jan. 6, 2011

(65) Prior Publication Data
US 2012/0169166 A1 Jul. 5, 2012

(30) Foreign Application Priority Data

Jul. 3, 2009 (DE) .......... 10 2009 031 610
Apr. 28, 2010 (DE) .......... 10 2010 018 472

(51) Int. Cl.
*H02K 7/09* (2006.01)
*F16C 41/00* (2006.01)
*H02K 7/18* (2006.01)

(52) U.S. Cl.
CPC .......... *F16C 41/004* (2013.01); *H02K 7/09* (2013.01); *F16C 41/007* (2013.01); *H02K 7/1846* (2013.01)
USPC ............. 310/90.5; 310/90; 384/446; 384/448

(58) Field of Classification Search
CPC ...................................... H02K 29/12
USPC ............... 310/90, 90.5, 68 B; 384/446, 448; 324/174
See application file for complete search history.

(56) References Cited

U.S. PATENT DOCUMENTS

| 5,204,653 A | 4/1993 | Saitoh et al. |
| 5,385,410 A | 1/1995 | Shirai et al. |

(Continued)

FOREIGN PATENT DOCUMENTS

| EP | 1 177 959 A2 | 2/2002 |
| JP | 1 284573 A | 11/1989 |

(Continued)

OTHER PUBLICATIONS

JP 01284573 A to Ozaki, Ryuichi (Nov. 1989) English Translation.*

(Continued)

*Primary Examiner* — Quyen Leung
*Assistant Examiner* — Robert E Mates
(74) *Attorney, Agent, or Firm* — Simpson & Simpson, PLLC (57) ABSTRACT

A bearing, which has a first bearing ring, a second bearing ring and a claw pole generator-type power generation unit. The bearing has a substantially space-neutral power generation unit, which has a high filling factor for the induction coil. Every claw ring is connected to a section of the body of the first bearing ring in a magnetically conducting fashion and the magnetic circuit is substantially closed via the section of the body of the first bearing ring.

16 Claims, 3 Drawing Sheets

(56) References Cited

U.S. PATENT DOCUMENTS

| | | |
|---|---|---|
| 6,838,794 B2 | 1/2005 | Iwamoto et al. |
| 7,138,740 B2 * | 11/2006 | Mizutani et al. ............ 310/90.5 |
| 2003/0173844 A1 | 9/2003 | Iwamoto et al. |
| 2005/0174011 A1 | 8/2005 | Nmizutani et al. |
| 2009/0102314 A1 * | 4/2009 | Miyata et al. ................ 310/257 |

FOREIGN PATENT DOCUMENTS

| | | | |
|---|---|---|---|
| JP | 2003269477 A | * | 9/2003 |
| WO | WO 2008027535 A2 | * | 3/2008 |

OTHER PUBLICATIONS

JP 2003269477 A to Okada et al. (Sep. 2003) English Translation.*

* cited by examiner

BEARING HAVING A POWER GENERATION UNIT

CROSS-REFERENCE TO RELATED APPLICATIONS

This application is a 371 of PCT/DE2010/000762 filed Jul. 1, 2010, which in turn claims the priority of DE 10 2009 031 610.8 filed Jul. 3, 2009 and DE 10 2010 018 472.1 filed Apr. 28, 2010. The priority of these applications is hereby claimed and these applications are incorporated by reference herein.

BACKGROUND OF THE INVENTION

The invention relates to a bearing, which has a power generation unit.

The prior art discloses bearings which comprise a power generation unit in the form of a claw pole generator. The claw pole generator comprises an induction coil with an electrical conductor which is wound with a plurality of turns. In order to supply a voltage which is sufficient even at low rotation speeds, the induction coil should have a high fill factor, i.e. the electrical conductor should have as high a number of turns as possible.

U.S. Pat. No. 6,838,794 B2 describes a bearing, in particular a roller bearing, which comprises a first bearing ring, a second bearing ring and a power generation unit, which is in the form of a claw pole generator. In addition, the bearing also comprises a first claw ring fastened to the first bearing ring that has a sequence of first claws running peripherally along a circumference of the first bearing ring, a second claw ring fastened to the first bearing ring that has a sequence of second claws running peripherally along the circumference of the first bearing ring, and a magnetic induction coil, which is arranged between the two claw rings. The bearing further comprises a sequence of magnetic poles in the form of a magnet ring that run peripherally along a circumference of the second bearing ring, a magnetic induction coil, which is arranged between the two claw rings, a closed magnetic circuit that runs peripherally around the induction coil to the second magnetic pole of the magnet ring, which does not have the same name as the first magnetic pole, which is closed by a first magnetic pole of the magnet ring via a first claw of the first claw ring and via a second claw of the second claw ring. If the two bearing rings rotate relative to one another, the magnetic flux in the magnetic circuit changes since each claw is guided past a different pole. The change over time in the magnetic flux induces an AC voltage in the induction coil with a magnitude which is dependent on the number of turns in the induction coil. In order to achieve as high an induced voltage as possible, a large number of turns need to be provided for the induction coil. The induction coil is arranged in a receptacle in the form of a U in cross-section. The limbs of the U are formed by the two claw rings, and the two claw rings are magnetically conductively connected to one another by the base of the U, such that the magnetic flux is guided through the first claw in the first limb of the U of the receptacle, then through the base of the U of the receptacle and then through a second claw in the second limb of the U of the receptacle. The base of the U of the receptacle bears against the first bearing ring and reduces the amount of physical space between the two bearing rings which is available for receiving as high a number of turns of the induction coil as possible. One measurement which is proposed for increasing the number of turns of the induction coil is that of providing in each case one recess in the two opposing bearing rings and arranging the induction coil and the sequence of magnetic poles in the respective recess, with the result that the induction coil can take up an increased amount of space. For this purpose, structural changes to the two lateral surfaces of the two bearing rings are required.

US 2005/0174011 A1 describes a bearing in the form of a roller bearing which has a claw pole generator. A sequence of magnetic poles in the form of a peripherally running magnet ring are arranged in a recess in the second bearing ring, and a section of the induction coil, surrounded in cross-section on all sides by the sheet-metal cuts of the two claw rings, rests on an end face of the first bearing ring or a section of said induction coil arranged in a recess that is arranged in the lateral surface of the first bearing ring. The bearing further comprises a sensor, specifically a rotation speed sensor, to which power is applied from the claw pole generator. The sensor is arranged on the magnet ring.

SUMMARY OF THE INVENTION

Broadly, the invention relates to a bearing, which has a first bearing ring, a second bearing ring and a power generation unit. The power generation unit comprises a sequence of magnetic poles running peripherally along a circumference of the second bearing ring, a first claw ring fastened to the first bearing ring which has a sequence of first claws running peripherally along a circumference of the first bearing ring, a second claw ring fastened to the first bearing ring, which has a sequence of second claws running peripherally along the circumference of the first bearing ring, and a magnetic induction coil, which is arranged between the two claw rings. A closed magnetic circuit runs peripherally around the induction coil to the second magnetic pole and is closed by a first magnetic pole via a first claw of the first claw ring and via a second claw of the second claw ring.

The object of the invention is to specify a bearing with a power generation unit which is substantially neutral in terms of installation space and has a high fill factor for the induction coil.

This object is achieved according to the invention for the bearing by virtue of the fact that each of the two claw rings is arranged in a magnetically conductive connection with a section of the body of the first bearing ring, and that the magnetic circuit is closed substantially via the section of the body of the first bearing ring.

One solution to achieve the object envisages the use of a magnetically conductive adhesive for fastening a claw ring or a magnetic pole, in particular a magnet ring comprising a plurality of magnetic poles, to a magnetically conductive body of a bearing ring of a roller bearing.

Closing the magnetic circuit via substantially the section of the body of the first bearing ring which is arranged between the two claw rings makes it possible to bring the induction coil close to the first bearing ring, with the result that the number of turns of the induction coil is increased without any structural change needing to be performed on the first or second bearing ring. In this way, a high so-called fill factor for the induction coil can be achieved, with the result that a high voltage can be tapped off from the induction coil even at low rotation speeds of the bearing.

The induction coil is arranged, for example, in a receptacle which is substantially in the form of a U in cross-section, the two limbs of the U being formed by the two claw rings, but the base of the U being formed by the section of the body of the first bearing ring which is in the form of a section of the magnetic circuit.

If a basic body of the first bearing ring is formed from a material with no or only poor magnetic conductivity, such as plastic or ceramic, the magnetically conductive section is formed, for example, by a coating applied to the basic body or by a sleeve fitted on the basic body consisting of a magnetically conductive material, the two claw rings then being brought into magnetically conductive connection with the coating or the sleeve.

A structural unit comprising the two claw rings, the induction coil and a receptacle consisting of a magnetically nonconductive material such as plastic, by means of which the induction coil is arranged fixedly and received between the claw rings, can be produced easily, for example by virtue of the two claw rings and a ring-shaped place holder for the induction coil being introduced into an injection mold. The interspace between the two claw rings around the place holder are filled with the plastic and then the place holder being removed, with the result that a hollow is formed, and into which hollow the induction coil can be inserted. The insertion of the induction coil into the hollow can be performed, for example, by a winding process, in which the electrical conductor in the form of a wire is wound into the hollow in layers, the individual sections of the electrical conductor being electrically insulated from one another, for example, by means of a varnish. The resultant structural unit is open on one side, namely towards the surface of the magnetically conductive section of the first bearing ring. It is possible that the material of the receptacle, specifically the plastic, does not surround the induction coil, with the electrical lines received in the insulation completely, but a slot is left exposed, in particular on the open side of the structural unit. If the structural unit is fitted on the first bearing ring in such a way that a magnetically conductive connection is achieved between the two claw rings and the section of the first bearing ring which closes the magnetic circuit, the slot forms a cavity close to the wall of the section of the first bearing ring, said cavity in particular also magnetically insulating the two claw rings, with the result that the cavity, together with the magnetically nonconductive material of the receptacle, is configured as a magnetically nonconductive connection between the two claw rings. It goes without saying that magnetically nonconductive elements such as a seal, for example, can be introduced into the resultant cavity.

Provision is made for at least one of the two claw rings to have a body in the form of a circular ring and having a radial slit. The radial slit in at least one of the two claw rings suppresses eddy currents and increases the effectiveness of the magnetic flux guidance through the two claws which are adjacent to the slit. The slit further makes it possible to press together and spread apart the claw ring slightly and to insert it between the two bearing rings, with the result that the claw ring bears, under prestress, against the first hearing ring and in particular a large limit face with respect to the first bearing ring is formed, which simplifies guidance of the magnetic flux out of or into that section of the body of the first bearing ring which closes the magnetic circuit.

Provision is made for the claw ring to have a recess between two claws which are adjacent in the circumferential direction. In particular, provision can be made for at least one of the claw rings to only comprise the claws, without forming a further cohesive connection between adjacent claws, with the result that the recess between two adjacent claws is the interspace between the two adjacent claws. In this way, eddy current losses are suppressed particularly effectively. If the claw ring comprises a body in the form of a circular ring, whose constituent part is the claws, the claws being held in a holder in the form of a bore or slot in the section of the body of the circular ring, eddy current losses in the claw ring close to the claws can be suppressed along the entire circumference of the circular ring.

In order to suppress the eddy currents in the circular ring, provision can further be made for the body of the circular ring to be formed from an electrically nonconductive material, the claws consisting of the magnetically conductive material being fastened to the body of the circular ring. The claw ring can comprise, for example, a body consisting of a plastic or a flexible, thin ceramic, the claws being fastened to the body, for example inserted into slots or clearances provided in the body, the body bearing against the wall of inserted into slots or clearances provided in the body, the body bearing against the wall of that section of the first bearing ring which closes the magnetic circuit so as to form a seal and a slight prestress.

Provision is made for at least one of the claws of the claw ring to have a circumferential section in the form of a segment of a circle and for a radius of the circle segment to correspond to a radius of the circumference of the bearing ring. The edge in the region of the circumferential section, in the form of a segment of a circle, of the claw of the claw ring is in this case positioned in a substantially form-fitting manner against the associated section of the hearing ring, with the result that a substantially linear interface occurs between the claw and the body of the hearing ring, said interface forming only a low magnetic resistance within the closed magnetic circuit.

Provision is made for the claw ring to bear flat against a circumferential section of the bearing ring. Owing to this flat, not merely linear bearing arrangement, the magnetic resistance of the interface between the claw and the body of the bearing ring is reduced. The flat hearing arrangement of the claw against the bearing ring can be achieved, for example, by virtue of the fact that the claw or the claw ring has a set-down contact face, which bears flat against a lateral surface of the bearing ring.

Provision is made for a cut-out running peripherally in the circumferential direction to he arranged on an end face of the hearing ring and for a section of the claw ring to be arranged in the cut-out. In this case, the claw ring or the claw comprises a substantially radially directed surface section which rests on the end face of the first bearing ring. Such a measure can be performed without any substantial structural change to the first bearing ring or to the claw or the claw ring.

Provision is made for a magnetically conductive contact element to the adjoining section of the body of the bearing ring to be arranged on the claw ring. The contact element reduces the magnetic resistance in the magnetic circuit at the edge of at least one of the two claw rings to the body of the first bearing ring.

As an alternative or in addition to a magnetically conductive contact element arranged on the claw ring, provision is made for a magnetically conductive contact element to the adjoining section of the body of the bearing ring to be arranged on at least one of the magnetic poles, in particular on the magnet ring. In this case, the contact element makes it possible to close the magnetic circuit between the two poles, in particular the poles of the magnet ring.

Irrespective of whether the magnetically conductive contact element is provided on the claw ring or on at least one of the magnetic poles, in particular on the magnet ring, provision is made with respect to the design of the contact element for the magnetically conductive contact element to comprise a liquid or paste-like adhesive, in particular an adhesive containing iron or ferrite particles. The adhesive fills gaps and interspaces between the first hearing ring and the claw or the claw ring. Furthermore, the adhesive makes it possible for the claw or at least one of the two claw rings to he fastened simply, possibly additionally, in some cases detachably, if required, to the first bearing ring, with a reduction in the magnetic resistance at the resultant interface with the first bearing ring. The adhesive can comprise, for example, a known adhesive material, to which iron or ferrite particles, in particular in the form of chips, are added.

Provision is made for the bearing to further comprise a sensor, in particular a rotation speed sensor, to which power is applied from the power generation unit, the sensor being fastened to the first bearing ring. The arrangement of the sensor on the first bearing ring, and thus spaced apart from the magnets arranged on the second bearing, ring, ensures that the sensor is magnetically influenced only slightly. The sensor is in particular arranged neutrally in terms of installation space as a flat structural unit.

Provision is made to the arrangement of the sensor for the sensor to comprise a printed circuit board and for the printed circuit board to be arranged on a receptacle for the induction coil. The receptacle for the induction coil can in particular have a cut-out, within which the sensor is arranged, with the result that the sensor is arranged so as to terminate flush with the receptacle for the induction coil.

The invention likewise comprises the use of a magnetically conductive adhesive for fastening a claw ring or a magnetic pole, in particular a magnet ring comprising a plurality of magnetic poles, to a magnetically conductive body of a bearing ring of a roller bearing.

Further advantages and features of the invention are given in the dependent claims and the description relating to the exemplary embodiments.

The invention will be described and explained in more detail below with reference to the attached drawings.

DETAILED DESCRIPTION OF THE INVENTION

Figure 1:
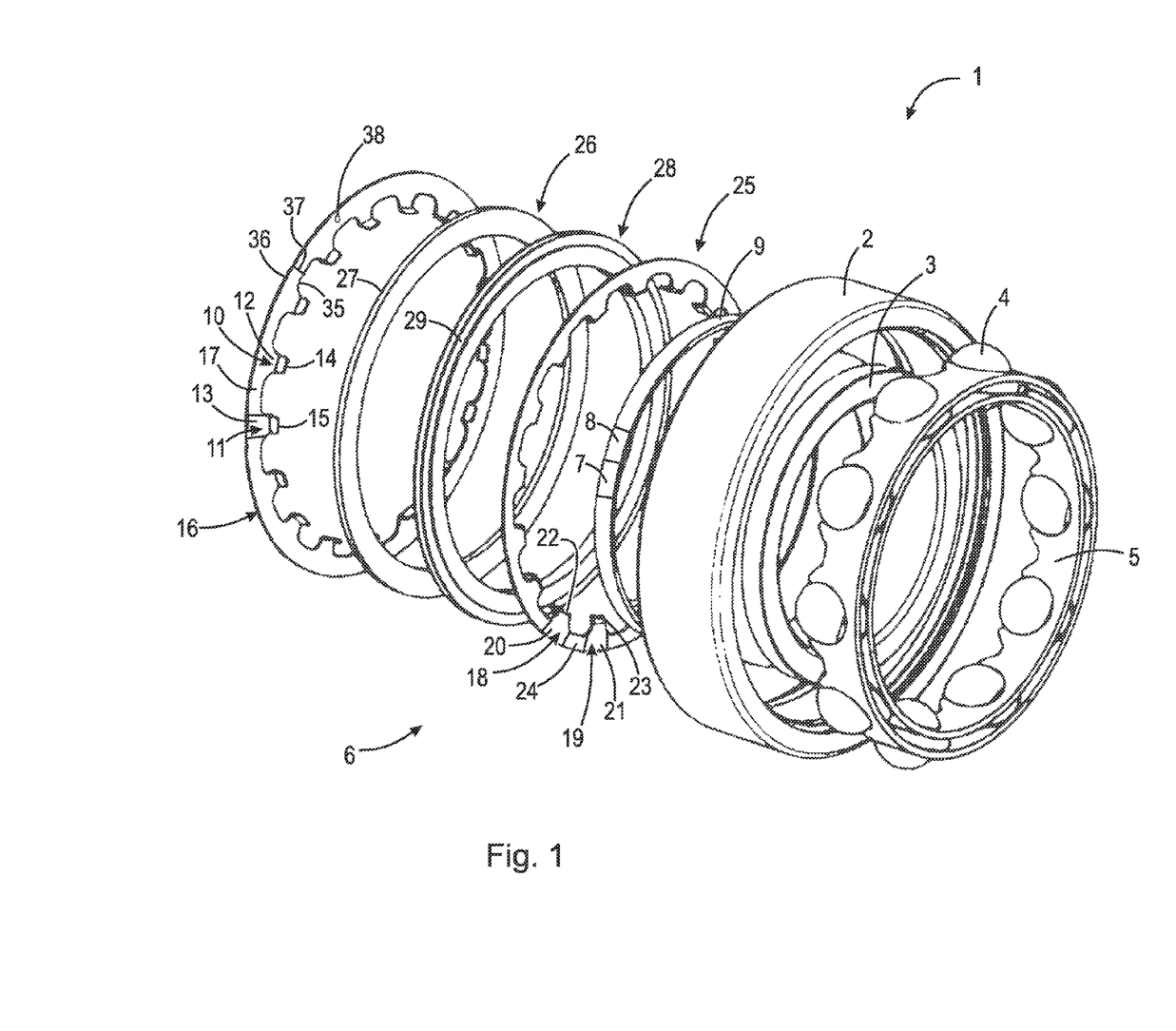
FIG. 1 shows an exploded illustration of an exemplary embodiment of a bearing according to the invention.

FIG. 1 shows a bearing 1 in the form of a roller bearing, which comprises a first bearing ring 2 in the form of an outer ring of the hearing 1 and a second bearing ring 3 in the form of an inner ring of the bearing 1. The second bearing ring 3 receives a shaft (not illustrated in the figures) and bears on this shaft rotatably with respect to a bearing receptacle (not illustrated in the figures), on which the first bearing ring 2 is arranged fixedly. The hearing 1 further comprises rolling bodies 4, which are arranged in a cage 5 between the two bearing rings 2, 3 and make it possible for the second hearing ring 3 to rotate relative to the first bearing ring 2.

The hearing 1 further comprises a power generation unit 6 in the form of a claw pole generator.

The power generation unit 6 comprises a sequence of magnetic poles running peripherally along a circumference of the second bearing ring 3, with two poles of different names which are adjacent to one another in the circumferential direction being provided with the reference symbols 7 and 8. The poles are combined to form a magnet ring 9, which is fastened on the second bearing ring 3. The poles, in particular the two poles 7, 8 adjacent in the circumferential direction, are magnetized sections of the magnet ring 9. The magnet ring 9 comprises a securing layer running peripherally along the circumference that consists of a winding of glass fibers, which is reinforced with cured epoxy resin to form a composite so that the magnets inserted into the magnet ring 9 are not pushed out at high rotation speeds.

The power generation unit 6 further comprises a first claw ring fastened to the first bearing ring 2 that has a sequence of first claws running peripherally along a circumference of the first hearing ring 2. Two claws adjacent in the circumferential direction are indicated by the reference symbols 10, 11. The first claws 10, 11 of the first claw ring comprise a radially directed, magnetically conductive section 12, 13, and an axially set-back, likewise magnetically conductive section 14, 15 pointed towards the roller body 4. All of the first claws of the first claw ring are formed on a ring-shaped body 16 of the first claw ring so that the adjacent first claws 10, 11 are connected to one another by means of an intermediate section 17.

The power generation unit 6 further comprises a second claw ring fastened to the first bearing ring 2 that has a sequence of second claws running peripherally along the circumference of the first bearing ring 2. Two second claws adjacent in the circumferential direction are provided with the reference symbols 18, 19. The second claws 18, 19 of the second claw ring each comprise a radially directed, magnetically conductive section 20, 21 and an axially set-back section 22, 23, which is directed away from the roller body 4. The respective adjacent second claws 18, 19 of the second claw ring are connected by means of a further intermediate section 24 so as to form a ring-shaped body 25 of the second claw ring.

The power generation unit 6 further comprises a magnetic induction coil 26, which is arranged between the two claw rings 16, 25 and comprises a winding of an electrical conductor (not illustrated in the figures) running peripherally along the circumference of the two bearing rings 2, 3. The windings of the conductor are received in a matrix in the form of a circular ring and consists of an electrically insulating material, in particular a varnish. The induction coil 26 has a coil slot 27 running peripherally along the circumference.

The power generation unit 6 further comprises a receptacle 28 for the induction coil 26. The receptacle 28 is formed from a magnetically nonconductive material such as a plastic. The receptacle 28 has a body in the form of a circular ring which is open at one end and has a U-shaped cross-section forming a slot 29 within which the induction coil 26 is inserted.

The induction coil 26, the receptacle 28 and the two claw rings 16, 25 form a structural unit. The induction coil 26 is received in the slot 29 in the receptacle 28. The intermediate section 17 and the radial sections 12, 13 of the first claws of the first claw ring 16 are arranged externally on a first limb of the U of the receptacle 28. The further intermediate sections 24 and the radial sections 20, 21 of the second claws 18, 19 of the second claw ring 25 are arranged on the second limb of the U of the receptacle 28. The base of the U of the receptacle 28 is arranged radially inwards, with respect to the axis of rotation, with the result that that section of the U of the receptacle 28 which is open at one end and is defined by the slot 29 points towards the first bearing ring 2, on which the structural unit is fastened.

The two claw rings 16, 25 are arranged relative to one another in such a way that the respective claws are offset with respect to one another in the circumferential direction. In particular, the axial section 22 of the second claw 18 of the second claw ring 25 is arranged centrally, in a circumferential direction, between the axial sections 14, 15 of the first claws 10, 11 of the first claw ring 16. Furthermore, the claws are arranged with respect to the magnetic poles 7, 8 of the magnet ring 9 in such a way that the axial section 22 of the second claw 18 of the second claw ring 25 is substantially radially opposite the first pole 7 and the axial section 14 of the first claw 10 of the first claw ring 16 is substantially radially opposite the adjacent, in the circumferential direction, pole 8 with a different name, with the result that the lines of force of a magnetic field enter a section of the first bearing ring 2 from the first pole 7 via the axial section 22 and the radial section 20 of the second claw 18 and form a closed magnetic circuit via the radial section 12 and the axial section 14 of the first claw 10 to the second pole 8, said magnetic circuit running peripherally around the induction coil 26. If the magnetic field running peripherally around the induction coil 26 changes, for example upon rotation of the first bearing ring 2 relative to the second bearing ring 3, an AC voltage is induced in the induction coil 26, and this AC voltage can be tapped off at the ends of the induction coil and can be used as power supply or for detecting the rotary movement.

The first claw ring 16 illustrated in FIG. 1 furthermore has a recess 38 between two claws adjacent in the circumferential direction. The recess 38 is a circular or a linear through-bore in the intermediate region 17 between two first claws adjacent in the circumferential direction. Such recesses are provided in all intermediate regions 17, but are only illustrated in the figure for one of the intermediate regions 17. It goes without saying that recesses can also be provided for the body 25 in the form of a circular ring of the second claw ring. The recesses 38 in this case suppress the occurrence of eddy currents between two claws, adjacent in the circumferential direction, of a claw ring and enlarge the air-gap distances between two claws, adjacent in the circumferential direction, of the two claw rings 16, 25.

The first claw ring 16 illustrated in FIG. 1 has a body, which has a radial slit 37 that extends from an inner border 35 to an outer border 36 of the body 16 in the form of a circular ring, in an intermediate region 17 between two first claws adjacent in the circumferential direction. Correspondingly, the second claw ring 25 can likewise have a slit (not illustrated in the figure). The slit 37 makes it possible to press the body 16 together so that the first claw ring can be clamped under radial prestress against the inner wall 34 of the first bearing ring 2.

Figure 2:
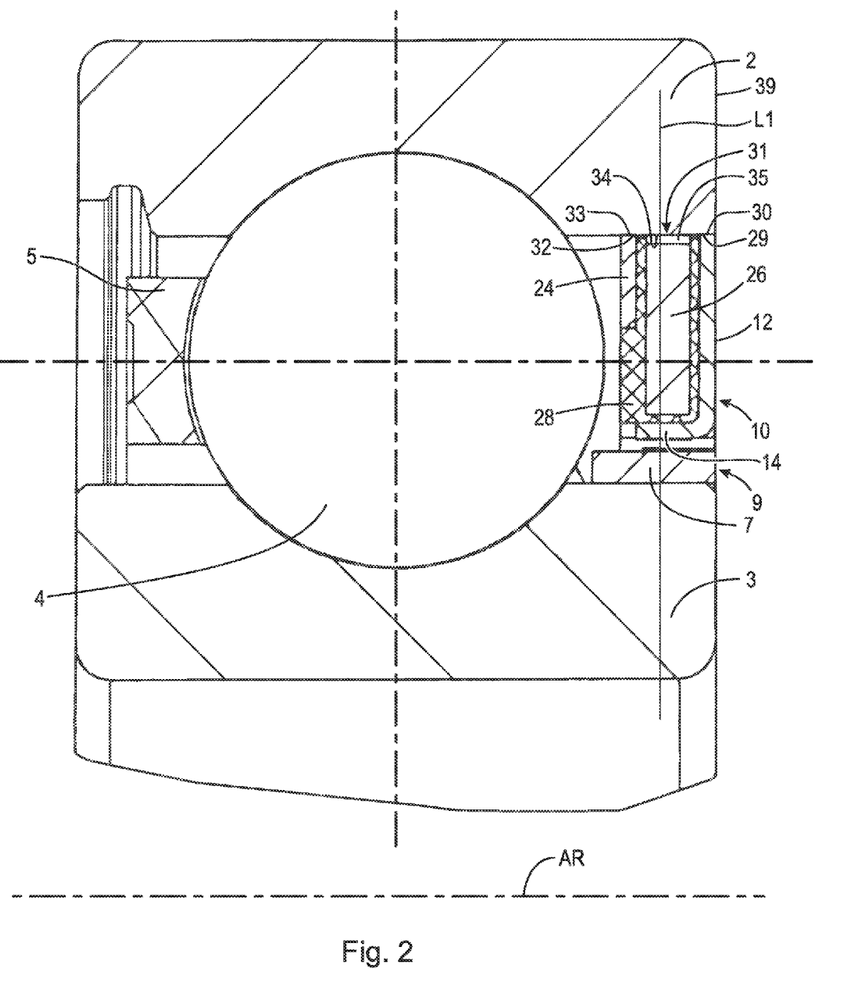
FIG. 2 shows the bearing shown in FIG. 1 in a cross-sectional view.

FIG. 2 shows a cross-sectional view of the bearing 1 shown in FIG. 1 in a position in which the power generation unit 6 is arranged fixedly on the first bearing ring 2 and on the second bearing ring 3. The sectional plane of the illustration in FIG. 2 is such that the section is passed through the first claw 10 of the first claw ring 16. The claws, which are next to the first claw 10 of the first claw ring 16 in the circumferential direction, namely the second claws 18, 19 of the second claw ring 25, are arranged above and below the plane of the paper, respectively. Therefore, of the second claw ring 25, only the further intermediate section 24 of the body of the second claw ring 25 is shown.

The sectional plane of the illustration in FIG. 2 is furthermore such that the recess 38 shown in FIG. 1 or the slot 37 cannot be seen.

The axial section 14 of the first claw 10 is radially opposite the first magnetic pole 7 of the magnet ring 9, with a small gap being left. The radial section 12 of the first claw 10 bears with one edge 29 against an opposing edge 30 of the body of the first bearing ring 2. The edge 29 forms an interface with the opposing edge 30, and it is possible for the magnetic field to enter a section 31 of the body of the first bearing ring 2 via said interface.

In the region of the further intermediate section 24, the second claw ring 25 likewise bears with one edge 32 against an opposing edge 33 of the body of the first bearing ring 2. The magnetically conductive section 31 of the first bearing ring 2 is thus substantially delimited by the two edges 32, 29 of the two claw rings 16, 25.

Along the edge 29, the first claw 10 bears substantially linearly against the body of the first bearing ring 2. For this purpose, provision is made for the first claw 10 of the first claw ring 16 to have a circumferential section in the form of a segment of a circle and for a radius of the circle segment to correspond to a radius of the circumference of the first bearing ring 2. In particular, the entire body 16, in the form of a circular ring, of the first bearing ring 2 has an edge running peripherally in the form of a ring, a section of said edge corresponding to the edge 29 of a first claw 10, with the outer radius of the body 16, in the form of a circular ring, substantially corresponding to the inner radius of the first bearing ring 2. It goes without saying that, even for the second claws of the second claw ring, provision can be made for the respective second claw to have a circumferential section in the form of a segment of a circle and for a radius of the circle segment to correspond to a radius of the circumference of the first bearing ring 2. Since the second claws of the second claw ring 25 are in the form of sections of the body 25 in the form of a circular ring, provision is correspondingly made for an outer radius of the body of the second claw ring 25 to correspond to an inner radius of the first bearing ring 2.

The two claw rings 16, 25 are held spaced apart from one another, in magnetically nonconductive fashion, by the plastic of the receptacle 28 and the resin matrix of the induction coil 26. Furthermore, a distance is maintained between that side of the U-shaped cross-section of the receptacle 28 which points radially outwards and an inner wall 34 of the magnetically conductive section 31 of the body of the second bearing ring 2 so as to form a cavity 34, which runs peripherally along the circumference and separates the two edges 29, 32 of the two claws of the two claw rings 16, 25, prevents a magnetic short circuit between the two claw rings 16, 25 and forces magnetic flux guidance between the edges 29, 32 through the magnetically conductive section 31. A magnetically nonconductive material, for example a sealing material based on plastic, can be introduced in to the cavity 34. As an alternative to this, the cavity 34 can be evacuated for the filling with the sealing material in order to facilitate fitting of the structural unit with the two claw rings 16, 25 and the induction coil 26.

FIG. 2 shows that the power generation unit 6 is fixed directly on the substantially hollow-cylindrical inner lateral surface of the body of the first bearing ring, 2, for example by means of a press fit, without having to make any geometric changes to the hollow-cylindrical shape of the inner lateral surface so as to receive the power generation unit 6. It can further be seen that the radial section 12 of the first claw 10 of the first claw ring with the body 16 in the form of a circular ring terminates substantially flush with the end face 39 of the first hearing ring 2. The magnet ring 9 is likewise arranged on the cylindrical outer lateral surface of the second bearing ring 3 and likewise terminates flush with the end face thereof, with the result that the power generation unit 6 is arranged in substantially neutral fashion with respect to installation space in relation to the bearing 1 with the bearing rings 2, 3. The induction coil 26 reaches up close to the inner wall 34 of the magnetically conductive section 31 of the body of the first bearing ring 2 so that a high fill factor can be achieved, which makes it possible to produce a sufficient output voltage of the electrical conductor received in the induction coil 26 even at low rotation speeds.

Figure 3:
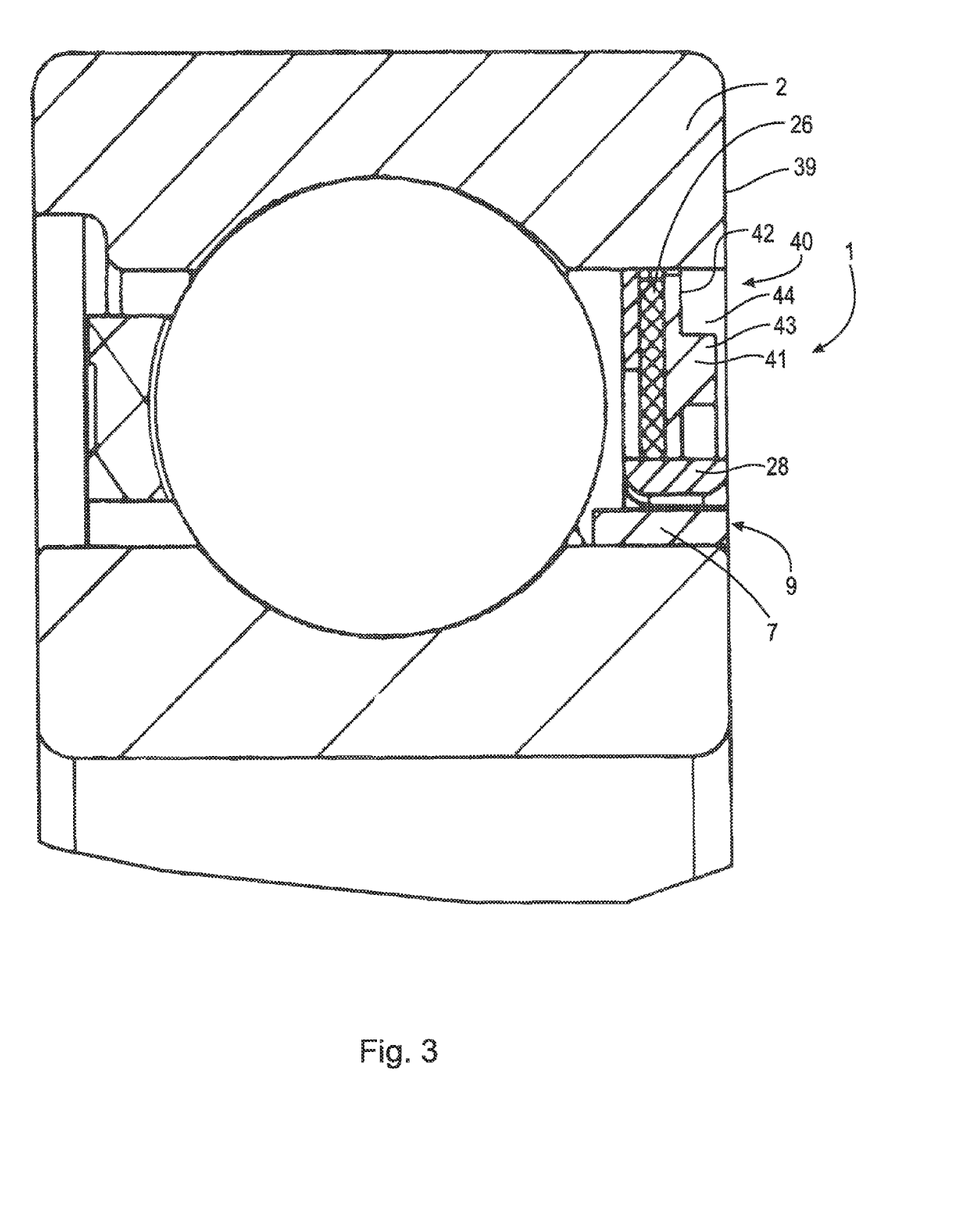
FIG. 3 shows a cross-sectional view of an exemplary embodiment in developed form with respect to FIGS. 1 and 2.

FIG. 3 shows an exemplary embodiment developed with respect to the exemplary embodiment illustrated in FIGS. 1 and 2, in which developed exemplary embodiment the hearing 1 additionally comprises a sensor 41, namely a rotation speed sensor with an integrated temperature detection unit and an antenna. Therefore, the same reference symbols denote the same features or features which are comparable in terms of their technical function below.

A cut-out 40, which extends along a section of the circumference of the first bearing ring 2 and in which the sensor 41 is received, is provided opposite a first magnetic pole 7 of a magnet ring 9, i.e. on the first bearing ring 2 in the form of an outer ring of the hearing 1, in a receptacle 28 for an induction coil 26. The cut-out 40 in this case extends over some of the claws of the claw ring. The sensor 41 comprises a printed circuit board 42, on which electronic components 43, for example a capacitor, a temperature sensing unit and an antenna, are arranged. The printed circuit board 42 is arranged adjacent to the induction coil 26 in the cut-out 40 of the receptacle 28 for the induction coil 26, without the induction coil 26 itself needing to have a limited installation space. For this purpose, one of the two limbs of the receptacle which is substantially in the form of a U in cross-section is omitted, with the result that the printed circuit board 42 is arranged instead of the omitted limb. The printed circuit board 42 is covered by a casting compound 44. The casting compound 44, for example a cured varnish, terminates flush with an end face 39 of the first bearing ring 2. The receptacle 28 of the induction coil 26 and therefore the printed circuit board 42 of the sensor 41 is fastened fixedly on the first bearing ring 2. The sensor 41 is accommodated in mechanically protected fashion, with the result that lubrication of the bearing 1 is possible without impairing the sensor 41.

Power is applied to the sensor 41 by means of the AC voltage induced in the induction coil 26. The sensor 41 is thus in particular autonomous in terms of power and can transmit measurement data detected by the sensor 41, i.e. in particular information relating to the rotation speed, the temperature and the operating time, wirelessly over relatively great distances to a remote receiver.

In this case, the sensor 41 comprises a feed line from the induction coil 26 or a generator fed by the induction coil 26, the feed line, in a first branch, supplying power to a power supply unit for a memory and to the mentioned temperature sensing unit and to a microprocessor and, in a second branch, providing the voltage, which is produced by the induction coil 26 or the generator and has a frequency which is dependent on the relative rotation speed of the two bearing rings 2, 3, to a rotation speed detection unit, it being possible for the rotation speed detection unit to infer the rotation speed of the bearing 1 from the frequency of the voltage, for example. The induction coil 26 therefore produces both the electrical power for the sensor 41, in particular for the sensor elements of the first branch, and the input variable for the second branch of the sensor 41. The rotation speed detection unit of the sensor 41 determines the rotation speed of the bearing 1 from the input variable of the second branch. The rotation speed detection unit is thus the component of the sensor 41 which determines the relative rotation speed of the two hearing rings 2, 3 of the bearing 1, to be precise from the period (or the frequency) and/or the amplitude of the voltage produced by the induction coil 26.

The measurement results of the rotation speed direction unit in the second branch and the measurement results of the temperature sensing unit in the first branch as well as data from the memory in the first branch are combined and evaluated in the microprocessor, with the microprocessor emitting a signal to a transmission and reception unit, which for its part is likewise supplied with power from the power supply unit in the first branch. The transmission and reception unit transmits signals, at a frequency of 868 megahertz, for example, to an antenna, which is arranged as a PCB (printed circuit board) antenna on the printed circuit board 42. A quartz crystal as clock generator for the antenna the antenna itself, and antenna adjustment means are formed as electronic components on the printed circuit board 42. The temperature sensing unit, the microprocessor, the rotation speed detection unit, the power supply and the memory are likewise arranged as electronic components, for example as the component 43 in FIG. 3, on the printed circuit board 42. The sensor 41 can both transmit and be addressed externally via the antenna in order to transmit data, for example, or to detect active measured values and to determine measurement results and transmit these measurement results. In particular, provision is made for the sensor 41 to comprise the rotation speed detection unit, the temperature sensing unit and the transmission and reception unit, to each of which power is applied from the power generation unit 6. The sensor 41 is thus a structural unit which is supplied with power from the power generation unit 6 of the bearing as a single power source which is common to all of the components of the sensor 41. In this case, the antenna can be addressed and read at a distance of a few meters up to a distance of approximately 15 meters.

In the above-described exemplary embodiment, the two claw rings 16, 25 are each positioned along the edges 29, 32 of the claws 10 and therefore each bear linearly against the inner wall 34 of the first bearing ring 2. Ti goes without saying that provision can be made for at least one of the two claw rings 16, 25 to bear flat against a circumferential section of the first bearing ring 2. For this purpose, the respective claw or the respective claw ring can have an axially set-back section in the region of the outer border 36, with which the respective claw or the respective claw ring 16, 25 bears flat against the inner wall 34 of the body of the first hearing ring 2.

As an alternative or in addition, provision can be made, in order to form the flat hearing arrangement of at least one of the two bearing rings against a circumferential section of the first bearing ring 2, for the respective radial section 12, 13 of the first claws 10, 11 or of the first claw ring 16 to rest on an end face 39 of the first bearing ring 2. In particular, provision can be made for a cut-out running peripherally in the circumferential direction to he arranged on the end face 39 of the first bearing ring 2 and for a section of the claw ring to be arranged in the cut-out, with the result that the section received in the cut-out does not protrude beyond the adjoining end face 39.

In the above-described exemplary embodiment, the first claws 10, 11 of the first claw ring 16 are connected by means of the intermediate regions 17 to form the body 16, substantially in the form of a circular ring, of the first claw ring. It goes without saying that the intermediate region 17 can also be omitted, with the result that the first claw ring is formed from a peripherally running sequence of individual first claws which are no longer connected to one another. The individual first claws 10, 11 of the first claw ring can likewise be connected by an intermediate region 17 to form a single claw ring, with the intermediate region 17 being formed from a magnetically nonconductive material, for example a plastic. In particular, the flat, radial sections 12, 13 of the first claws 10, 11 can be inserted into guide slots in the plastic at the side edges and can be received in these guide slots in radially displaceable fashion in order to make it possible to form a fixed bearing arrangement against the magnetically conductive section 31 of the body of the first bearing ring 2. It goes without saying that a corresponding configuration can also be provided for the second claws 18, 19 of the second claw ring 25.

In the above-described exemplary embodiment, the claw rings 16, 25 or the claws 10, 11, 18, 19 bear with the edges 29, 32 respectively against opposing edges 30, 33 of the body of the first bearing ring 2. It goes without saying that it is also possible for receiving slots to be provided in the body of the first bearing ring 2, said receiving slots receiving the edges 29, 32 and surrounding the edges 29, 32 on a plurality of sides.

In the above-described exemplary embodiment, the axial sections 14, 15 of the first claws 10, 11 of the first claw ring 16 or the axial sections 22, 23 of the second claws 18, 19 of the second claw ring 25 have a respective trapezoidal contour, in a radial viewing direction pointing away from the bearing axis. Such a trapezoidal contour avoids hearing noises, in particular during fast-rotating operation of the bearing 1. It goes without saying that the claws can also have a different configuration. In particular, the claws 10, 11 or 18, 19 can be restricted merely to the radial sections 12, 13 or 20, 21.

Bearing rings known from the prior art in some cases comprise a sealing slot running peripherally along the circumference. The structural unit comprising the two claw rings 16, 25 and the induction coil 26 with the receptacle 28 can be fixed on such a sealing slot, for example by virtue of a sealing element being fastened on the receptacle 28, the induction coil 26 or one of the two claw rings 16, 25 and the sealing element being fixed in the sealing slot. Instead of the sealing element, or in addition to the sealing element, a magnetically conductive contact element, for example in the form of a liquid or paste-like adhesive, can be provided, said magnetically conductive contact element filling a cavity between the sealing element and one of the two claw rings and improving or producing for the first time the magnetically conductive connection between one of the two claw rings and the magnetically conductive section of the body of the bearing ring 2. However, the contact element maintains a distance from the other of the two claw rings, with the result that the magnetic circuit is closed via the magnetically conductive section 31 of the body of the first bearing ring 2 and not directly between the two claw rings 16, 25.

In the above-described exemplary embodiment, the claw rings 16, 25 are fastened on the first bearing ring 2, which is in the form of an outer ring, and the magnet ring 9 with the magnetic poles 7, 8 is fastened on the second bearing ring 3 in the form of an inner ring. It has been assumed here that the inner ring 3 is arranged rotatably in the fixed outer ring 2, with the result that the claw rings 16, 25 remain fixed with respect to the magnet ring 9. As an alternative to this, provision can be made for the magnet ring 9 to be fixed and for the claw rings 16, 25 to revolve with respect to the magnet ring 9. Specifically, provision can be made for the claw rings 16, 25 to be arranged on a rotating inner ring with respect to the fixed outer ring. Such an arrangement makes it possible to provide electrical power at the rotating inner ring and avoids power being conducted between the two bearing rings, for example via wiper contacts. In this case, the receptacle 28 for the induction coil 26 is fastened on the inner ring and has a two-part design, for example, with the induction coil being inserted as a prefabricated unit between the two parts of the receptacle and then the two parts of the receptacle being joined, for example by means of a clip or latching connection, to form the receptacle.

LIST OF REFERENCE SYMBOLS

Line L1, orthogonal to axis of rotation AR for roller bearing 1, passes through bearing rings 2 and 3, one of claws 16 or 25, magnetic ring 9, and induction coil 26.
1 Bearing
2 First Bearing Ring
3 Second Bearing Ring
4 Roller Body
5 Cage
6 Power Generation Unit
7 Magnetic Pole
8 Magnetic Pole
9 Magnet Ring
10 Claw of First Claw Ring
11 Claw of First Claw Ring
12 Radial Section of Claw 10
13 Radial Section of Claw 11
14 Axial Section of Claw 10
15 Axial Section of Claw 11
16 Body of First Claw Ring
17 Intermediate Section
18 Claw of Second Claw Ring
19 Claw of Second Claw Ring
20 Radial Section of Claw 18
21 Radial Section of Claw 19
22 Axial Section of Claw 18
23 Axial Section of Claw 19
24 Further Intermediate Section
25 Body of Second Claw Ring
26 Induction Coil
27 Coil Slot
28 Receptacle
29 Edge
30 Opposing Edge
31 Section of Body of First Bearing Ring 2
32 Edge
33 Opposing Edge
34 Inner Wall of Section 31
35 Inner Border of Body 16
36 Outer Border of Body 16
37 Radial Slit
38 Recess
39 End Face
40 Cut-out
41 Sensor
42 Printed Circuit Board
43 Electronic Component
44 Casting Compound

The invention claimed is:

1. A bearing, comprising:
an axis of rotation;
a first bearing ring having a body with a section;
a second bearing ring located radially inward of the first bearing ring body in a radial direction orthogonal to the axis of rotation;
a plurality of rolling bodies; and,
a power generation unit, comprising:
a magnetic ring including a sequence of magnetic poles, including a first magnetic pole and a second magnetic pole, running peripherally along a circumference of the second bearing ring;
a first claw ring, which is fastened to the first bearing ring, having:
a sequence of first claws running peripherally along a circumference of the first bearing ring; and,
a first edge in contact with the first bearing ring a second claw ring, which is fastened to the first bearing ring, having a sequence of second claws running peripherally along the circumference of the first bearing ring and including a second edge in contact with the first bearing ring;

a magnetic induction coil, which is arranged between the first claw ring and the second claw ring; and, a cavity:
  bounded by the first bearing ring, the magnetic induction coil and the first and second claw rings;
  located between the magnetic induction coil and the first bearing ring in the radial direction; and,
  located between the first and second claw rings in the axial direction, wherein:

every rolling body included in the bearing is included in the plurality of rolling bodies;

all the rolling bodies in the plurality of rolling bodies are aligned with each other in the circumferential direction;

a closed magnetic circuit, which runs peripherally around the magnetic induction coil to the second magnetic pole, is closed by the first magnetic pole via one of the first claws of the first claw ring and via one of the second claws of the second claw ring;

the first claw ring and the second claw ring are each arranged in a magnetically conductive connection with the section of the body of the first bearing rings; and, the magnetic circuit is closed substantially via the section of the body of the first bearing ring.

2. The bearing as claimed in claim 1, wherein the first claw ring has a body which is a circular ring that has a radial slit.

3. The bearing as claimed in claim 1, wherein the second claw ring has a recess between two claws which are adjacent in a circumferential direction of the second claw ring.

4. The bearing as claimed in claim 1, wherein one of the claws of one of the claw rings has a circumferential section formed as a segment of a circle, and a radius of the segment corresponds to a radius of the circumference of the first bearing ring.

5. The bearing as claimed in claim 1, wherein the first claw ring bears flat against a circumferential section of the first bearing ring.

6. The bearing as claimed in claim 5, wherein the first bearing ring has a cutout which runs peripherally in a circumferential direction and is arranged on an end face of the first bearing ring, and a section of the claw ring is arranged in the cutout.

7. The bearing as claimed in claim 1, wherein a magnetically conductive contact element to an adjoining section of the body of the first bearing ring is arranged on the first claw ring.

8. The bearing as claimed in claim 1 further comprising a magnetically conductive contact element, which adjoins the section of the body of the first bearing ring, is arranged on at least one of the magnetic poles.

9. The bearing as claimed in claim 8, wherein the magnetically conductive contact element comprises a liquid or pasty adhesive.

10. The bearing as claimed in claim 9, wherein the adhesive contains iron or ferrite particles.

11. The bearing as claimed claim 1, further comprising a sensor to which power is applied from the power generation unit, the sensor being fastened on the first bearing ring.

12. The bearing as claimed in claim 11, wherein the sensor is a rotation speed sensor.

13. The bearing as claimed in claim 11, further comprising a receptacle for the induction coil, the sensor comprising a printed circuit board arranged on the receptacle for the induction coil.

14. The bearing as claimed in claim 11, wherein the sensor comprises a rotation speed detection unit, a temperature sensing unit, and a transmission and reception unit, to which power is applied from the power generation unit.

15. A bearing, comprising:
an axis of rotation;
a first bearing ring having a body with a section;
a second bearing ring located radially inward of the first bearing ring body in a radial direction orthogonal to the axis of rotation;
a plurality of rolling bodies; and,
a power generation unit, comprising:
  a magnetic ring including a sequence of magnetic poles, including a first magnetic pole and a second magnetic pole, running peripherally along a circumference of the second bearing ring;
  a first claw ring, which is fastened to the first bearing ring having a sequence of first claws running peripherally along a circumference of the first bearing ring;
  a second claw ring, which is fastened to the first bearing ring, having a sequence of second claws running peripherally along the circumference of the first bearing ring and including a second edge in contact with the first bearing ring;
  a magnetic induction coil, which is arranged between the first claw ring and the second claw ring; and,
  a gap located between the magnetic induction coil and the first bearing ring in the radial direction and located between the first and second claw rings in the axial direction, wherein:
a line orthogonal to the axis of rotation passes through the magnetic ring, one of the first or second claw rings, the magnetic induction coil, and the first and second bearing rings;
a closed magnetic circuit, which runs peripherally around the magnetic induction coil to the second magnetic pole, is closed by the first magnetic pole via one of the first claws of the first claw ring and via one of the second claws of the second claw ring;
the first claw ring and the second claw ring are each arranged in a magnetically conductive connection with the section of the body of the first bearing ring; and,
the magnetic circuit is closed substantially via the section of the body of the first bearing ring.

16. The bearing of claim 15, wherein the first claw ring includes at least one through bore:
located, in a circumferential direction, between two respective first claws adjacent in the circumferential direction; and,
passing through material forming the first claw ring and wholly surrounded by the material in the radial direction.

* * * * *